US010676661B2

(12) United States Patent
Friedheim et al.

(10) Patent No.: US 10,676,661 B2
(45) Date of Patent: Jun. 9, 2020

(54) LOST CIRCULATION MATERIAL

(71) Applicant: M-I L.L.C., Houston, TX (US)

(72) Inventors: James Friedheim, Spring, TX (US);
John Moffitt, Sugar Land, TX (US);
Joshua Sheldon, Richmond, TX (US);
Quanxin Guo, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/944,403

(22) Filed: Nov. 18, 2015

(65) Prior Publication Data

US 2016/0137903 A1    May 19, 2016

Related U.S. Application Data

(60) Provisional application No. 62/081,153, filed on Nov. 18, 2014.

(51) Int. Cl.
*E21B 33/02* (2006.01)
*C09K 8/08* (2006.01)
(Continued)

(52) U.S. Cl.
CPC ............ *C09K 8/516* (2013.01); *C09K 8/501* (2013.01); *C09K 8/502* (2013.01); *C09K 8/514* (2013.01);
(Continued)

(58) Field of Classification Search
None
See application file for complete search history.

(56) References Cited

U.S. PATENT DOCUMENTS

| 4,629,575 A * | 12/1986 | Weibel | C09K 8/206 106/162.9 |
| 6,123,159 A * | 9/2000 | Brookey | C09K 8/08 166/294 |

(Continued)

FOREIGN PATENT DOCUMENTS

| GB | 2380502 A | 4/2003 |
| WO | 2014/017911 A1 | 1/2014 |
| WO | 2014/142651 A1 | 9/2014 |

OTHER PUBLICATIONS

Whitfill, D. (Jan. 1, 2008). Lost Circulation Material Selection, Particle Size Distribution and Fracture Modeling with Fracture Simulation Software. Society of Petroleum Engineers. doi:10.2118/115039-MS.*

(Continued)

*Primary Examiner* — William D Hutton, Jr.
*Assistant Examiner* — Charles R Nold (57) ABSTRACT

Fluid compositions including a base fluid and at least one granular hemicellulose material. The base fluid may be an oleaginous fluid or a non-oleaginous fluid. The granular hemicellulose material may have a cumulative particle size distribution D90 of about 4 mm or less and D10 of about 1 mm or greater, or D90 of 2.5 mm or less and D10 of about 1.5 mm or greater, or even D90 of about 3.8 mm or less, and D10 of about 2.4 mm or greater. The granular hemicellulose materials useful may have an average aspect ratio equal to or less than about 5:1, an average aspect ratio equal to or less than about 2:1, or even an average aspect ratio is about 1:1. The granular hemicellulose materials have hemicellulose in an amount from about 10% to about 50% by weight, cellulose in an amount from about 30% to about 50% by weight, and lignin in an amount from about 5% to about 35% by weight. The granular hemicellulose materials may be added to the base fluid in an amount from about 1 ppb to
(Continued)

about 50 ppb, or even from about 4 ppb to about 40 ppb. The fluid compositions may be useful for sealing fractures in a subterranean formation, and reducing fluid loss in a subterranean formation.

11 Claims, 4 Drawing Sheets (51) Int. Cl.
C09K 8/50 (2006.01)
C09K 8/56 (2006.01)
C09K 8/516 (2006.01)
E21B 21/00 (2006.01)
C09K 8/502 (2006.01)
C09K 8/514 (2006.01)

(52) U.S. Cl.
CPC ........ *E21B 21/003* (2013.01); *C09K 2208/04* (2013.01)

(56) References Cited

U.S. PATENT DOCUMENTS

2005/0103496 A1 5/2005 Todd et al.
2012/0247763 A1* 10/2012 Rakitsky ................ C04B 24/08
166/279

OTHER PUBLICATIONS

Combined Search and Examination Report for the equivalent Uk patent application 1505098.2 dated May 26, 2015.

* cited by examiner

GHM-A Granular Hemicellulose Material A (Corn Cob Based)

| Size, Microns | Percentage |
|---|---|
| 2000 | 0.5 |
| 2380 | 4.7 |
| 2830 | 32.5 |
| 3360 | 65.2 |
| 4000 | 100 |

Average Cumulative PSD

| | |
|---|---|
| D10 | 2465.9 microns |
| D50 | 3113.8 microns |
| D90 | 3816.1 microns |

FIG. 2A

GHM-B Granular Hemicellulose Material B (Corn Cob Based)

| Size, Microns | Percentage |
|---|---|
| 1410 | 1.5 |
| 1680 | 21.7 |
| 2000 | 75.8 |
| 2380 | 95.3 |
| 2830 | 96.6 |
| 3360 | 98.1 |
| 4000 | 100 |

Average Cumulative PSD

| | |
|---|---|
| D10 | 1523.6 microns |
| D50 | 1847.4 microns |
| D90 | 2276.7 microns |

LOST CIRCULATION MATERIAL

CROSS-REFERENCE TO RELATED APPLICATIONS

This application claims benefit of U.S. Provisional Patent Application Ser. No. 62/081,153, filed Nov. 18, 2014 and titled LOST CIRCULATION MATERIAL, the entire disclosure of which is herein incorporated by reference.

FIELD

Embodiments disclosed herein relate generally additives for reducing the effects of lost circulation of drilling fluid into the subterranean formation surrounding a wellbore during the drilling process.

BACKGROUND

The statements in this section merely provide background information related to the present disclosure and may not constitute prior art.

For the production of hydrocarbon wells, boreholes are drilled into subterranean formations. Following standard procedures, a fluid is circulated during drilling from the surface through the interior of the drill string and the annulus between drill string and formation. The drilling fluid, also referred to as "drilling mud", is used to accomplish a number of interrelated functions, such as suspending and transporting solid particles, such as drill cuttings, to the surface for screening out and disposal. The fluid may also transport a clay or other substance capable of adhering to and coating the uncased borehole surface, both (a) to exclude unwanted fluids which may be encountered, such as brines, thereby preventing them from mixing with and degrading the rheological profile of the drilling mud, as well as (b) to prevent the loss of downhole pressure from fluid loss should the borehole traverse an interval of porous formation material. The fluid may keep suspended an additive weighting agent (to increase specific gravity of the mud), typically barites (a barium sulfate ore, ground to a fine particular size), so that the entire column of drilling fluid is not interrupted upon encountering pressurized pockets of combustible gas, which otherwise would tend to reduce downhole pressure, as well as creating a "blowout" in which the fluid and even the drill stem are violently ejected from the well, with resulting catastrophic damages. The fluid may also constantly lubricate the drill bit so as to promote drilling efficiency and retard bit wear.

Drilling fluids may also be used to provide sufficient hydrostatic pressure in the well to prevent the influx and efflux of formation fluids and drilling fluids, respectively. When the pore pressure (the pressure in the formation pore space provided by the formation fluids) exceeds the pressure in the open wellbore, the formation fluids tend to flow from the formation into the open wellbore. Therefore, the pressure in the open wellbore is typically maintained at a higher pressure than the pore pressure. While it is highly advantageous to maintain the wellbore pressures above the pore pressure, on the other hand, if the pressure exerted by the drilling fluids exceeds the fracture resistance of the formation, a formation fracture and thus induced mud losses may occur, in a circumstance known as lost circulation. Further, with a formation fracture, when the drilling fluid in the annulus flows into the fracture, the loss of drilling fluid may cause the hydrostatic pressure in the wellbore to decrease, which may in turn also allow formation fluids to enter the wellbore. As a result, the formation fracture pressure typically defines an upper limit for allowable wellbore pressure in an open wellbore while the pore pressure defines a lower limit. Therefore, a major constraint on well design and selection of drilling fluids is the balance between varying pore pressures and formation fracture pressures or fracture gradients through the depth of the well.

Lost circulation is a recurring drilling problem, characterized by loss of drilling mud into subterranean formations. However, in addition to drilling fluids, lost circulation may remain an issue for other fluids such as including completion, drill-in, production fluid, etc.

Lost circulation may result from induced pressure during drilling, as described above. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones very difficult because the mud weight required to support the shale exceeds the fracture resistance of nearby zones composed of weakly consolidated sands and silts. Another unintentional method by which lost circulation can result is through the inability to remove low and high gravity solids from fluids. Without being able to remove such solids, the fluid density can increase, thereby increasing the hole pressure, and if such hole pressure exceeds the formation fracture pressure, fractures and fluid loss can result. Further, fluid loss can occur naturally in earthen formations that are naturally fractured, highly permeable, porous, cavernous, or vugular. These earth formations can include shale, sands, gravel, shell beds, reef deposits, limestone, dolomite, and chalk, among others.

The industry typically distinguishes between three classes of drilling fluids: oil-based, water-based and so-called synthetic muds. Oil-based and synthetics muds are recognized for their superior qualities for most of the drilling operations. The drilling fluid compositions may further include weighting agents, surfactants, proppants, viscosifiers, and polymers. The loss of drilling fluid into fractures is a major concern in the well construction process, and one class of additives often used includes fluid loss agents useful to prevent the drilling fluid from entering into porous or fractured formations. While fluid loss agents are designed to form a competent filter cake to cover porous formations, there is another class of materials referred to as lost circulation materials. Lost circulation materials are designed to prevent or limit fluid losses into fractures or other openings in the formation. Lost circulation materials are typically particulates that invade the fracture and at some point along the fracture, form a blocking bridge across the fracture. When the fracture is bridged a filter cake may develop due to the pressure difference between the wellbore fluid and the fluid beyond the fracture block. The pressure beyond the filtercake or bridge block is reduced and thus may prevent the full borehole pressure from affecting the tip of the fracture. However any further increase in the wellbore fluid pressure may result in further opening of the fracture leading to renewed losses.

Accordingly, there exists a continuing need for developments of new lost circulation materials, and treatments that may be used during a lost circulation event so that circulation may be more readily resumed, such need met at least in part by embodiments disclosed herein.

SUMMARY

Some aspects of the disclosure include wellbore fluid compositions which include a base fluid and at least one granular hemicellulose material. The base fluid may be an oleaginous fluid or a non- oleaginous fluid. The granular hemicellulose material may have a cumulative particle size distribution $D_{90}$ of about 4 mm or less and $D_{10}$ of about 1 mm or greater, or $D_{90}$ of 2.5 mm or less and $D_{10}$ of about 1.5 mm or greater, or even $D_{90}$ of about 3.8 mm or less and $D_{10}$ of about 2.4 mm or greater. The granular hemicellulose materials useful may have an average aspect ratio equal to or less than about 5:1, an average aspect ratio equal to or less than about 2:1, or even an average aspect ratio is about 1:1. The granular hemicellulose materials may include hemicellulose in an amount from about 10% to about 50% by weight, cellulose in an amount from about 30% to about 50% by weight, and lignin in an amount from about 5% to about 35% by weight. The granular hemicellulose materials may be added to the fluid in an amount from about 1 ppb to about 50 ppb, or even from about 4 ppb to about 40 ppb.

In another aspect, embodiments disclosed herein relate methods of reducing fluid loss in a subterranean formation, which include preparing a fluid composition from a base fluid and at least one granular hemicellulose material, and emplacing the fluid loss composition in an interval of the subterranean formation. The method may further include applying pressure to the wellbore to drive the fluid loss composition into the formation. In some cases, the method includes allowing the fluid composition to form a plug or seal in at least one interval of the subterranean formation. The plug or seal formed may be sufficient in strength to withstand applied pressures of up to about 4500 psi. The at least one granular hemicellulose material may have a particle size distribution D90 of about 4 mm or less, and D10 of about 1 mm or greater, and an average aspect ratio equal to or less than about 5:1. The fluid may have a granular hemicellulose material content of from about 1 ppb to about 50 ppb.

Yet, other aspects include methods of sealing fractures in a subterranean formation by preparing a fluid loss composition including a base fluid and at least one granular hemicellulose material, where the at least one granular hemicellulose material has a particle size distribution D90 of about 4 mm or less and D10 of about 1 mm or greater, an average aspect ratio equal to or less than about 5:1, and wherein the at least one granular hemicellulose material content in the fluid loss composition is from about 1 ppb to about 50 ppb. The fluid loss composition is then emplaced the in the fractures of the subterranean formation.

Other illustrative variations within the scope of the disclosure will become apparent from the detailed description provided hereinafter. It should be understood that the detailed description and specific examples, while disclosing optional variations, are intended for purposes of illustration only and are not intended to limit the scope of the invention.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit embodiments of the disclosure, their application, or uses. At the outset, it should be noted that in the development of any such actual embodiment, numerous implementation specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended that any and every point within the range, including the end points, is to be considered as having been stated. For example, "a range of from 1 to 10" is to be read as indicating each and every possible value along the continuum between about 1 and about 10. Thus, even if specific data points within the range, or even no data points within the range, are explicitly identified or refer to a few specific, it is to be understood that inventors appreciate and understand that any and all data points within the range are to be considered to have been specified, and that inventors possessed knowledge of the entire range and all points within the range.

As used herein, concentrations may be expressed as ppm (parts per million), pounds per barrel (ppb), and/or by a percentage of the material in the total composition. Unless otherwise stated, all percentages express a weight percent (wt %), based on the amount of the material or component at issue in the total composition weight.

In a drilling operation, usually a pipe is lowered from the surface carrying a drill bit. The drill bit is rotated and thus removes formation material ahead to extend the well. During most drilling operations, a drilling fluid is pumped through the pipe and the drill bit. The drilling fluid returns to the surface through the annulus of the drilled well. Among other properties, the drilling fluid in the annulus exerts a pressure on the surrounding formation to prevent both, the formation from collapsing into the well and sudden potentially hazardous influx of formation fluids. However the pressure exerted by the drilling fluid, when exceeding the strength of the surrounding formation, may generate fractures. Other fractures or openings may be already present in the formation and crossed by the trajectory of the well.

Through such fractures, a large amount of drilling fluid can be suddenly lost to the formation. To prevent the occurrence or to mitigate the damages caused by lost circulation, so-called lost-circulation materials or agents are circulated in the well either as additives to the drilling fluid or as "pill" treatment.

In some aspects of the disclosure, fluid compositions containing granular hemicellulose materials may provide a blockage such as a seal or plug, thus preventing further fluid loss and facilitating further drilling operations. By utilizing the unique properties of three-dimensional shapes of the granular hemicellulose materials, and combinations thereof, the materials may interact synergistically to form a seal that arrests the flow of wellbore fluids into the formation.

Without being limited by any particular theory, it is believed that as granules of hemicellulose material present in a fluid composition pumped into a wellbore may enter fractures in the subterranean formation, and may interferingly trap and entangle with other such granules and/or other particles present in the fluid, creating an barrier that at least substantially prevents further fluid loss to the formation. It may be envisioned that the granules do not penetrate the fracture as deeply is other structures, such as fibers, and may more quickly form at least a partial plug nearer the wellbore wall, due to their relatively low aspect ratio. These granules of hemicellulose material may act to create a three-dimensional network that can further trap particulates of varying sizes, generating a filtercake that substantially prevents fluid flow in or out of the wellbore. Because of the network created by granules, and perhaps other particulates present, a synergistic effect may be achieved where reduced amounts of each of the individual components are necessary to reduce fluid losses downhole and/or strengthen the formation. In addition, the overall reduction of plug forming materials incorporated into the fluids allows the formulation of a wellbore fluid effective in preventing fluid loss and/or strengthen the formation that is still pumpable through standard delivery means such as drill strings and coiled tubing, as opposed to specialized delivery methods normally required to emplace concentrated slurries in thief zones or fluid loss sites. Further, the relatively low load of granules, which may lead to an overall reduction in all plug forming materials, may provide an improvement in pumping equipment service life. As used herein, the term "aspect ratio" means the proportional relationship between a smallest linear dimension of a granule and a largest linear dimension of the granule, and the term "average aspect ratio" means the proportional relationship between the average of smallest linear dimensions of a plurality granules and the respective average of largest linear dimensions.

Figure 1A:
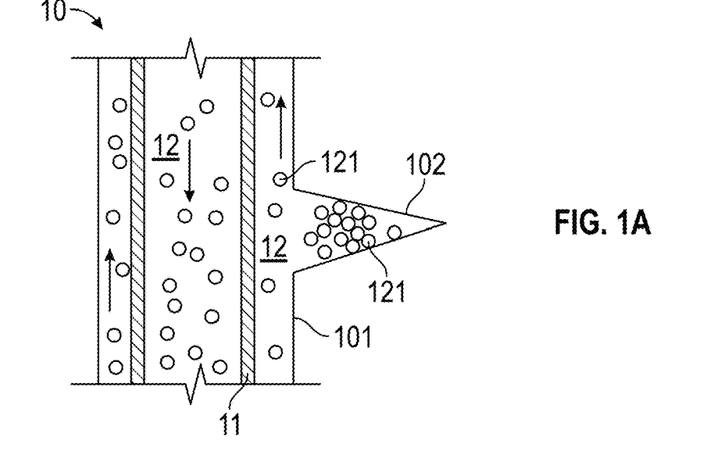
FIG. 1A, 1B and 1C together illustrate a fracture in a subterranean formation during various stages of a drilling operation.

Some embodiments of the disclosure are particularly useful for larger aperture fractures in subterranean formations which extend from the wellbore wall into the formation. In some instances the fractures may have apertures 2 mm, 3 mm, 4 mm, 5 mm in width, or even larger. To illustrate the usefulness of some embodiments of the disclosure for fractures with larger apertures, FIG. 1A depicts a section of a drilled well 10. Also shown is a part of the drill string 11, and drilling fluid 12 circulating in the well. The mud includes granules of hemicellulose material as at least a portion of, if not the major component of the lost circulation material. It is assumed that the pressure in the well exceeds the strength of the formation 101 and, consequently, a fracture 102 opens; or alternatively, the fracture 102 is a natural structure in formation 101. As drilling fluid flows into the fracture 102, lost circulation material 121 accumulates until the fracture is bridged or plugged by a sufficient amount of the material. In the case that the fracture is induced by the drilling operation, once a plug is established, the pressure drops across it and the tip of the fracture is no longer subjected to the full well pressure, and it can be assumed that the growth of the fracture stops.

Figure 1B:
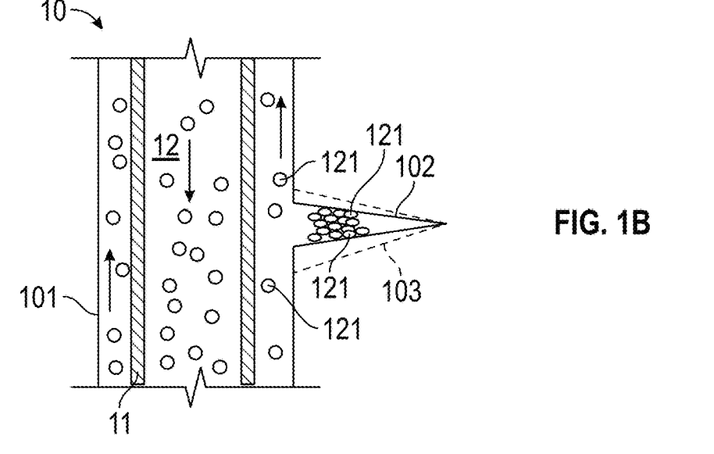
Figure 1C:
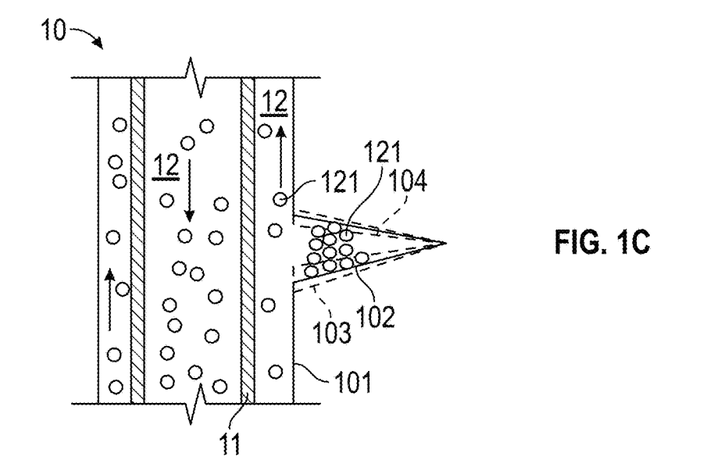

FIG. 1B illustrates a subsequent stage in those cases where the fracture is induced by the drilling operation. The well pressure is reduced and the fracture 102 closes though not fully. The dashed line 103 in FIG. 1B indicates the dimension of the original fracture. In the process of closure, the granules of hemicellulose lost-circulation material 121 in the fracture may be compressed by the formation 101 and, depending on its properties, either reversibly or irreversibly compacted and deformed. FIG. 1C illustrates the re-opening of the fracture 102 as the pressure in the well is raised again. Under normal circumstances the re-opening pressure is lower that the initial fracturing pressure. As the fracture opens, the lost-circulation material 121 may tend to loose contact with the formation wall inside the fracture 102 and the well fluid pressure may force a further opening the fracture. Or it may be that the re-opening of the fracture destabilizes the bridge or plug of material 121 established in the prior step. Both types of failures can lead to an increased pressure at the tip of the fracture. According to some aspects of the disclosure, it is seen as an important feature of a lost circulation material to raise the threshold pressure for the re-opening of the fracture. As illustrated in FIG. 1C, it is the resilience of the granules of hemicellulose lost-circulation material 121 which may help prevent failure of the established bridge or plug, and thus raise the re-opening pressure. As the fracture 102 opens, the resilient material 121 at least partly regain their shape and remain in contact with the formation 101. As shown above, the shape of the earlier stages of the fracture are indicated by a dashed line 103 denoting the original opening and a dotted line 104 indicating the shape of the fracture at the reduced well pressure (FIG. 1B). During a period in which the materials 121 retain a sealing effect, the fracture tip is exposed to a pressure which is reduced compared to the well pressure. Hence, the fracture opens only at an increased well pressure compared to other loss circulation materials.

The granular hemicellulose based material useful in accordance with the disclosure may be based upon natural materials, which may be chemically treated, derivatized, or in natural form. The granular hemicellulose based materials may be processed, sorted and sized according to techniques readily known to those of skill in the art. Hemicellulose is a polysaccharide related to cellulose that comprises about 20% to 50% of the biomass of most plants. In contrast to cellulose, hemicellulose is derived from several sugars in addition to glucose, especially xylose but also including mannose, galactose, rhamnose, and arabinose. Hemicellulose consists of shorter chains—around 200 sugar units. Furthermore, hemicellulose is branched, whereas cellulose is unbranched. A hemicellulose (also known as polyose) is any of several heteropolymers (matrix polysaccharides), such as arabinoxylans, present along with cellulose in almost all plant cell walls. While cellulose is crystalline, strong, and resistant to hydrolysis, hemicellulose has a random, amorphous structure with little strength. It is easily hydrolyzed by dilute acid or base as well as myriad hemicellulase enzymes.

Some natural sources of granular hemicellulose materials, include, but are not limited to, by-products of forestry and pulp-and paper industry (forest chips, wood meal and shavings), annual crops (straw, stalks, husk, hulls, cobs, bran), and the like. Some non-limiting examples of suitable annual crop sources of granular hemicellulose materials include corn cobs, nut shells, rice hull, rice straw, sugarcane leaf and stalk, sorghum leaf and stalk, bagasse, and the like. While not limiting, some useful granular hemicellulose materials have a hemicellulose content of from about 10% to about 50% by weight of the material, cellulose content of from about 30% to about 50% by weight of the material, and a lignin content of from about 5% to about 35% by weight of the material. It will be appreciated that any point within the ranges of hemicellulose, cellulose and lignin content provided above are within the scope of the disclosure.

Any suitable size and shape of granular hemicellulose material may be used in accordance with the disclosure. The sizes of the granular hemicellulose materials may be selected based on the fracture width, and in some instances, may be less than the fracture openings so that they can enter the fractures. The granular hemicellulose material has a particle size distribution which may have a D90 of from about 20 mm to 4 mm and less, and any point within that range. In some instances, the granular hemicellulose material has a particle size distribution which may have a $D_{90}$ of about 4 mm or less and $D_{10}$ of about 1 mm or greater. In some other cases, the granular hemicellulose material has a particle size distribution which may have a $D_{90}$ of 2.5 mm or less and $D_{10}$ of about 1.5 mm or greater, and in yet other cases, a $D_{90}$ of about 3.8 mm or less and $D_{10}$ of about 2.4 mm or greater. It will be appreciated that any point within the particle size ranges provided above are within the scope and spirit of the disclosure.

The three dimensional shape of the granular hemicellulose materials may be of any suitable shape, either symmetrical or asymmetrical. The particular shape is not necessarily limiting of the embodiments disclosed. However, some examples of suitable shapes include materials which are substantially spheroid, rod, cubical, ovate, block, powder, particulates, beads, chips, bead, ribbon, platelet, film, strip, toroid, pellet, tablet, capsule, shaving, any round cross-sectional shape, any oval cross-sectional shape, trilobal shape, star shape, flat shape, rectangular shape, bar shaped, flake, cylindrical shape, filament, thread, or mixtures thereof, and any of which may be symmetrical or asymmetrical. In some aspects of the disclosure, the granular hemicellulose material has an average aspect ratio equal to or less than about 5:1, or an average aspect ratio equal to or less than about 4:1, or an average aspect ratio equal to or less than about 3:1, while in some other aspects the average aspect ratio is equal to or less than about 2:1. In some instances the average aspect ratio is about 1:1 or otherwise substantially unity.

The one or more granular hemicellulose materials may be added to the fluid composition in an amount ranging from a lower limit selected from the group of 0.25 ppb (pound per barrel), 0.5 ppb, 1 ppb, 3 ppb, 4 ppb and 5 ppb, to an upper limit selected from the group of about 2 ppb, 5 ppb, 8 ppb, 10 ppb, 15 ppb, 20 ppb, 30 ppb, 40 ppb and 50 ppb. In some embodiments, however, more or less may be desired depending on the particular application and subterranean conditions.

Fluid compositions in accordance with some aspects of the disclosure may be applied to an interval of a wellbore as a fluid "pill." As used herein, the term "pill" is used to refer to a relatively small quantity (typically less than 200 bbl) of a special blend of fluid to accomplish a specific task that the drilling fluid is not designed to accomplish. In one embodiment, the fluid composition may be used to plug thief zones or other regions where circulating fluids are being lost into the formation. Upon emplacement within the wellbore, a pill may be defluidized and lose a substantial portion of the base fluid to the formation such materials present in the pill form a plug or seal having sufficient compressive and shear strength for the particular application. Advantageously, upon placing the pill in the wellbore, the pill may be defluidized to lose a substantial portion of the base fluid to the formation such that the granular hemicellulose materials may form a plug or seal having sufficient compressive strength for the particular application, and which may even increase the tensile strength of the surrounding formation.

Some embodiments may incorporate at least one synthetic fiber type into the fluid loss compositions. In particular embodiments, the synthetic fibers may include high aspect ratio polymeric fibers. In some embodiments, the diameter of the synthetic fiber may be varied to alter the flexibility and durability of the resulting seal or plug formed when the fibers contact walls of a downhole formation. For example, in various embodiments, the fiber diameter may range from any lower limit selected from the group of 0.5 microns, 1 microns, 5 microns, and 10 microns to an upper limit selected from the group of 10 microns, 15 microns, 20 microns, and 50 microns. In one or more embodiments, the length of the fibers may be kept below a length of 8 mm, where the composition may become undesirably viscous and unpumpable through standard wellbore fluid delivery means. In one or more embodiments, the fibers may range in length from any lower limit selected from 0.5 mm, 1 mm, 3 mm, and 5 mm to any upper limit selected from 3 mm, 5 mm, 6 mm, and 7 mm. However, the length can be greater in some embodiments, such as where the composition is delivered into the wellbore by a bypass sub or open pipe. Any suitable length and aspect ratio of fiber is within the scope and spirit of the disclosure.

In some aspects of the disclosure, synthetic fibers may include, for example, vinyl polymers, ethylene, tetrafluoroethylene, vinylidene fluoride, propylene, butene, 1-butene, 4-methyl-1-pentene, polyaromatics, styrene, p-phenylene-2, 6-benzobisoxazo[e, polyvinyl alcohol, polyacrylic, polyacrylamide, partially hydrolyzed polyacrylamide, polyvinyl acetate, partially hydrolyzed polyvinyl acetate, polyamide, polyurethanes, and combinations thereof. In other embodiments, the synthetic fiber may be a polyolefin that may include, for example, propylene based homopolymers, copolymers, and multi-block interpolymers, and ethylene based homopolymers, copolymers, and multi-block interpolymers, and combinations thereof.

The one or more synthetic fibers may be added to the fluid composition in an amount ranging from a lower limit selected from the group of 0.25 ppb, 0.5 ppb, 1 ppb, 3 ppb, and 5 ppb to an upper limit selected from the group of 5 ppb, 8 ppb, 10 ppb, 15 ppb, and 20 ppb. In some embodiments, however, more or less may be desired depending on the particular application and subterranean conditions.

In some embodiments of the disclosure, fluid compositions may include particulate solids, in addition to granular hemicellulose materials, that may interact with the granular hemicellulose materials to further reduce fluid loss by incorporating into the plug or seal formed by the granular hemicellulose materials. In some instances, particulate solids that may be used in accordance with the disclosure may include any material that may aid in weighting up a fluid to a desired density, including the use of particles frequently referred to in the art as weighting materials, as well as particulates known in the art as lost circulation materials.

Particulate solids may be selected from one or more of the materials including, for example, barium sulfate (barite), ilmenite, hematite or other iron ores, olivine, siderite, and strontium sulfate. Other examples include graphite, calcium carbonate (preferably, marble), dolomite ($MgCO_3$, $CaCO_3$), celluloses, micas, proppant materials such as sands, ceramic particles, diatomaceous earth, calcium silicates, nut hulls, and combinations thereof. It is also envisaged that a portion of the particulate solids may comprise drill cuttings having an average particle diameter in the range of 25 to 3000 microns. In other embodiments, the particulate weighting agent may be composed of an acid soluble material such as calcium carbonate (calcite), magnesium oxide, dolomite, and the like. One having ordinary skill in the art would recognize that selection of a particular material may depend largely on the density of the material as typically, the lowest wellbore fluid viscosity at any particular density is obtained by using the highest density particles.

In some instances, particulate solids may be substantially spherical particles. However, it is also envisaged that the particulate solids may be elongate particles, for example, rods or ellipsoids, as well as flat or sheet-like particles, or any suitable shape, including those described above for granular hemicellulose materials. It will be appreciated that it is within the scope of the disclosure that any the suitable three dimensional shape of particulate solids may be used, whether symmetrical or asymmetrical. Where the particulate solids comprise elongate particles, the average length of the elongate particles should be such that the elongate particles are capable of entering the fractures. Typically, elongate particles may have an average length in the range 25 to 3000 microns, or 50 to 1500 microns in some embodiments, and 250 to 1000 microns in other embodiments.

The particle size of the particulate solids may be selected depending on the particular application, the level of fluid loss, formation type, and/or the size of fractures predicted for a given formation. The size may also depend on the other particles selected for use in the fluid composition. In one or more embodiments, the particulate solids may have an average diameter that ranges from a lower limit selected from the group of 100 microns, 250 microns, 500 microns, and 750 microns to an upper limit selected from the group of 400 microns, 500 microns, 750 microns, 1000 microns, 1500 microns, and 2000 microns, and 3000 microns. In yet other embodiments, combinations of particulate solids having different average size ranges may be combined in a single fluid composition.

The amount of particulate solid present in the fluid composition may depend on the fluid loss levels, the anticipated fractures, the density limits for a given wellbore and/or pumping limitations, etc. In some embodiments, the particulate solids may be added to the wellbore fluid compositions such that the final density of the fluid may range from 9 ppg up to 23 ppg in some embodiments; however, more or less may be desired depending on the particular application.

Any suitable amount of particulate solids may be incorporated into the fluids, in accordance with the disclosure. In one or more embodiments, the ratio of the granular hemicellulose materials to particulate solids may be controlled such that the fluid compositions have a comparative weight ratio of granular hemicellulose materials to particulate solids of from about 50:1 to about 1:50, from about 25:1 to about 1:25, from about 10:1 to about 1:10, from about 5:1 to about 1:5, or even about 1:1.

The base fluid, used in accordance with the disclosure, may be a non-oleaginous fluid or an oleaginous fluid. The non-oleaginous fluid may include at least one of fresh water, sea water, brine, mixtures of water and water-soluble organic compounds and mixtures thereof. For example, the non-oleaginous fluid may be formulated with mixtures of desired salts in fresh water. Such salts may include, but are not limited to alkali metal chlorides, hydroxides, or carboxylates, for example. In various embodiments of the fluids disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts. Additionally, brines that may be used in the pills disclosed herein may be natural or synthetic, with synthetic brines tending to be simpler in constitution. In one embodiment, the density of the pill may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oleaginous fluid may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. Selection between a non-oleaginous fluid and an oleaginous fluid may depend, for example, the type of drilling fluid being used in the well when the lost circulation event arises. Use of the same fluid type may reduce contamination and allow drilling to continue upon plugging of the formation fractures/fissures, etc.

Fluids compositions may be added in a discrete amount, for example as a pill (such as those described hereinabove), or added continuously until lost circulation is reduced to an acceptable level. When formulated as a pill, the fluid compositions are preferably spotted adjacent to the location of the lost circulation using methods known to those of skill in the art. Spotting may be accomplished by methods known in the art. For example, the permeable formation will often be at or near the bottom of the wellbore, since as the permeable formation is encountered, the formation will immediately begin to absorb drilling fluid and the loss of drilling fluid will increase as the permeable formation is penetrated, eventually resulting in a lost circulation condition. In such situations, the fluid compositions may be spotted adjacent the permeable formation by pumping a slug or pill of the slurry down and out of the drill pipe as is known in the art. It may be, however, that the permeable formation is at a point farther up in the wellbore, which may result, for example, from failure of a previous seal. In such cases, the drill pipe may be raised so that the pill or slug of the wellbore fluid composition may be deposited adjacent the permeable formation. The volume of the slug or pill that is spotted adjacent the permeable formation may range from less than that of the open hole to more than double that of the open hole. In some instances, it may be necessary to use more than one pill. Such need may arise when the first pill was insufficient to plug the fissures and thief zone, or was placed incorrectly. Further, in some instances, the first pill may have sufficiently plugged the first lost circulation zone, but a second (or more) lost circulation zone also exists needed treatment.

In some embodiments, fluid compositions may be added and the wellbore may be sealed and pressurized to defluidize the compositions. Defluidization may be accomplished either by hydrostatic pressure or by exerting a low squeeze pressure, as is readily known to those of skill in the art. Hydrostatic pressure may complete the seal; however, a low squeeze pressure may be desirable because incipient fractures or other areas of high permeability can be thereby opened and plugged immediately, thus reinforcing the zone and reducing or avoiding the possibility of later losses. After the defluidization is completed, the drilling fluid may be re-circulated through the wellbore to deposit a filtercake on the formation seal, and drilling may be resumed. Injection of the granular hemicellulose materials (as well as any other associated materials) into the formation may be achieved by an overbalance pressure (i.e., an overbalance pressure greater than the formation pressure). While in particular embodiments, the injection pressure may range from 100 to 400 psi, any overbalance pressure level, including less than 100 psi or greater than 400 psi may alternatively be used. The selection of the injection pressure may simply affect the level of injection of the fluid compositions into the formation.

The granular hemicellulose materials are added to the base fluid in any order with any suitable equipment to form the fluid composition. In some embodiments, the granular hemicellulose materials may be added to the fluid while pumping using specialized shakers. Fluid compositions formulated with granular hemicellulose materials may be mixed before pumping downhole in some embodiments. In other embodiments, a wellbore fluid containing granular hemicellulose materials may be introduced into the wellbore before a second wellbore fluid containing other the particulate solids and/or synthetic fibers, or vice versa in yet other embodiments.

It is also within the scope of the present disclosure that one or more spacer pills may be used in conjunction with the pills of the disclosure. A spacer is generally characterized as a thickened composition that functions primarily as a fluid piston in displacing fluids present in the wellbore and/or separating two fluids from one another.

In some embodiments, the fluid composition may include any of a number of other additives known to those of ordinary skill in the art of wellbore fluid formulations, such as, but not limited to, wetting agents, viscosifiers, surfactants, dispersants, interfacial tension reducers, pH buffers, mutual solvents, thinners, thinning agents, gelling agents, rheological additives and cleaning agents.

EXAMPLES

The following examples are provided to further illustrate the application and the use of the methods and compositions of the disclosure. In order to assay the ability of the composition to seal fractures samples were prepared containing varying solids volume fraction of fluid compositions containing varying concentrations of granular hemicellulose materials (GHM). Fluids were formulated as shown below in Tables 1 and 2 below. Particulate solids also evaluated in combination with the GHMs included G-Seal-Plus™ Coarse (GSPC), with a median particle size of 600-1000; Nut-Plug™ Medium (NPM), with a median particle size of 1200-1500 microns; and Nut-Plug Fine™ (NPF), with a median particle size of 400-500 microns; all of which are available from MI SWACO (Houston, Tex.).

Tests were performed using a high-pressure fracture simulation device which consisted of two metal plates with a variable gap that simulates a horizontal fracture intersecting a vertical wellbore. The plates were set to the desired width, which was monitored throughout the test. Test fluid was pumped at a constant flow rate into the device, and then flowed through the variable gap. Fluid pressure and volume were measured during this step. When the solid materials comprised in the fluid formed a seal, the fluid flow ceased and pressure increased. At certain pressure, the seal was unable to withstand the fluid pressure and failed. The seal forming, pressure building, seal failing process was repeated until the complete test fluid volume was fully introduced into the device. Comparing the average sealing pressures allowed the relative performance of various seal forming materials to be evaluated.

Figure 2A:
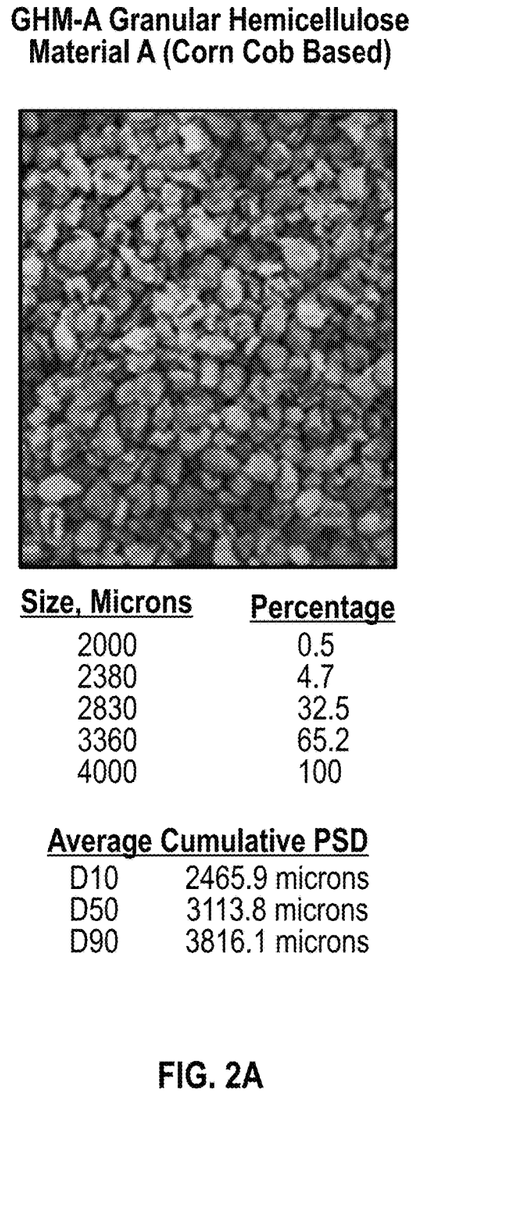
FIG. 2A and 2B show some ground corn cob based granular hemicellulose materials, as well as their respective particle size distributions, useful in some embodiments of the disclosure.
Figure 2B:
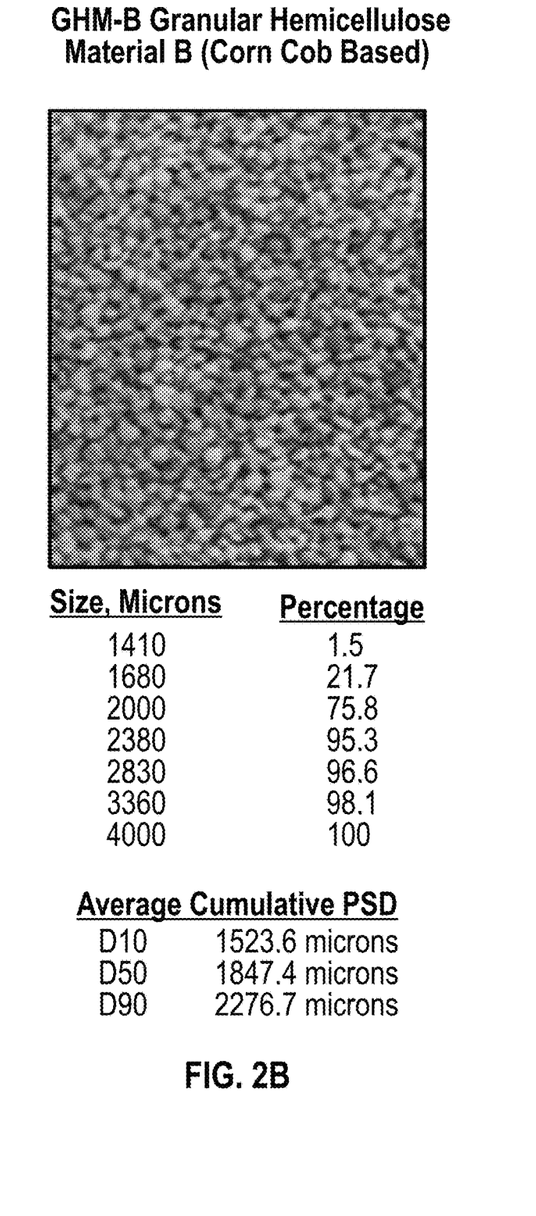

The following formulations were used in tests conducted according to the test procedure described hereinabove, with corresponding results illustrated in the graphical illustrations shown in FIGS. 3 and 4. Each of the formulations evaluated included granular hemicellulose materials (GHM) derived from corn cob stock, in addition to the other particulate materials described, in a non-oleaginous base fluid with a density of 13 ppg. Measured particle size distribution characteristics for the GHMs are given in Table 3 as well as FIG. 2A and FIG. 2B. The shape of the GHMs evaluated (GHM-A & GHM-B) were generally asymmetrical spheroid or cubical, with relatively low aspect ratios.

TABLE 1

| Ingredient | Concentration |
| --- | --- |
| GHM-B | 15 ppb |
| GSPC | 30 ppb |
| NPM | 15 ppb |

TABLE 2

| Ingredient | Concentration |
| --- | --- |
| GHM-A | 26 ppb |
| GHM-B | 11 ppb |
| GSPC | 13 ppb |
| NPF | 10 ppb |

TABLE 3

| GHM-B | | GHM-A | |
| --- | --- | --- | --- |
| Size, microns | Percentage | Size, microns | Percentage |
| 1410 | 1.5 | 2000 | 0.5 |
| 1680 | 21.7 | 2380 | 4.7 |
| 2000 | 75.8 | 2830 | 32.5 |
| 2380 | 95.3 | 3360 | 65.2 |
| 2830 | 96.6 | 4000 | 100 |
| 3360 | 98.1 | | |
| 4000 | 100 | | |

Figure 3:
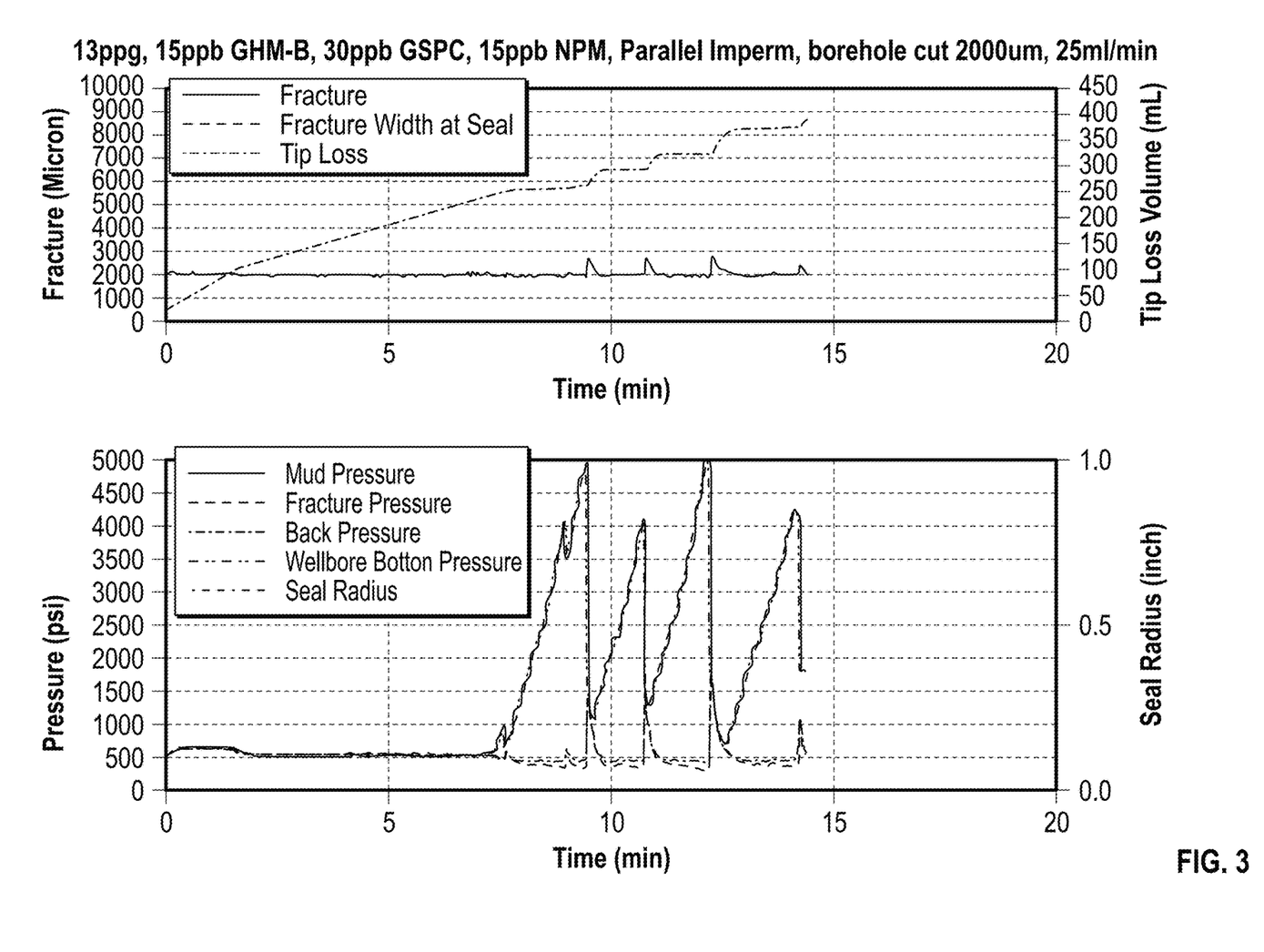
FIG. 3 is a graphical illustration of a lost circulation test conducted on a fluid including granular hemicellulose materials, in accordance with the some embodiments of the disclosure; and, FIG. 4 is a graphical illustration of a lost circulation test conducted on a fluid including granular hemicellulose materials, in accordance with the some embodiments of the disclosure.

In the first example, the test was conducted with the formulation described in Table 1, and provided graphical results shown in FIG. 3. The test fluid was injected at a rate of 25 ml/min, and the fracture width was about 2 mm. GHM-B had an average particle size distribution $D_{90}$ of about 2.3 mm and $D_{10}$ of about 1.5 mm. As shown by the tip loss rate and back pressure measurements given in FIG. 3, the plug or seal formed was effective at pressures up to about 5000 psi. The integrity of the plug or seal remained substantially intact, or otherwise not substantially damaged, even as mud pressure was varied in the course of the testing. This first example depicts the effectiveness of granular hemicellulose materials for contributing to the sealing or plugging fractures which may be present in a subterranean formation, to avoid lost circulation of drilling fluid.

Figure 4:
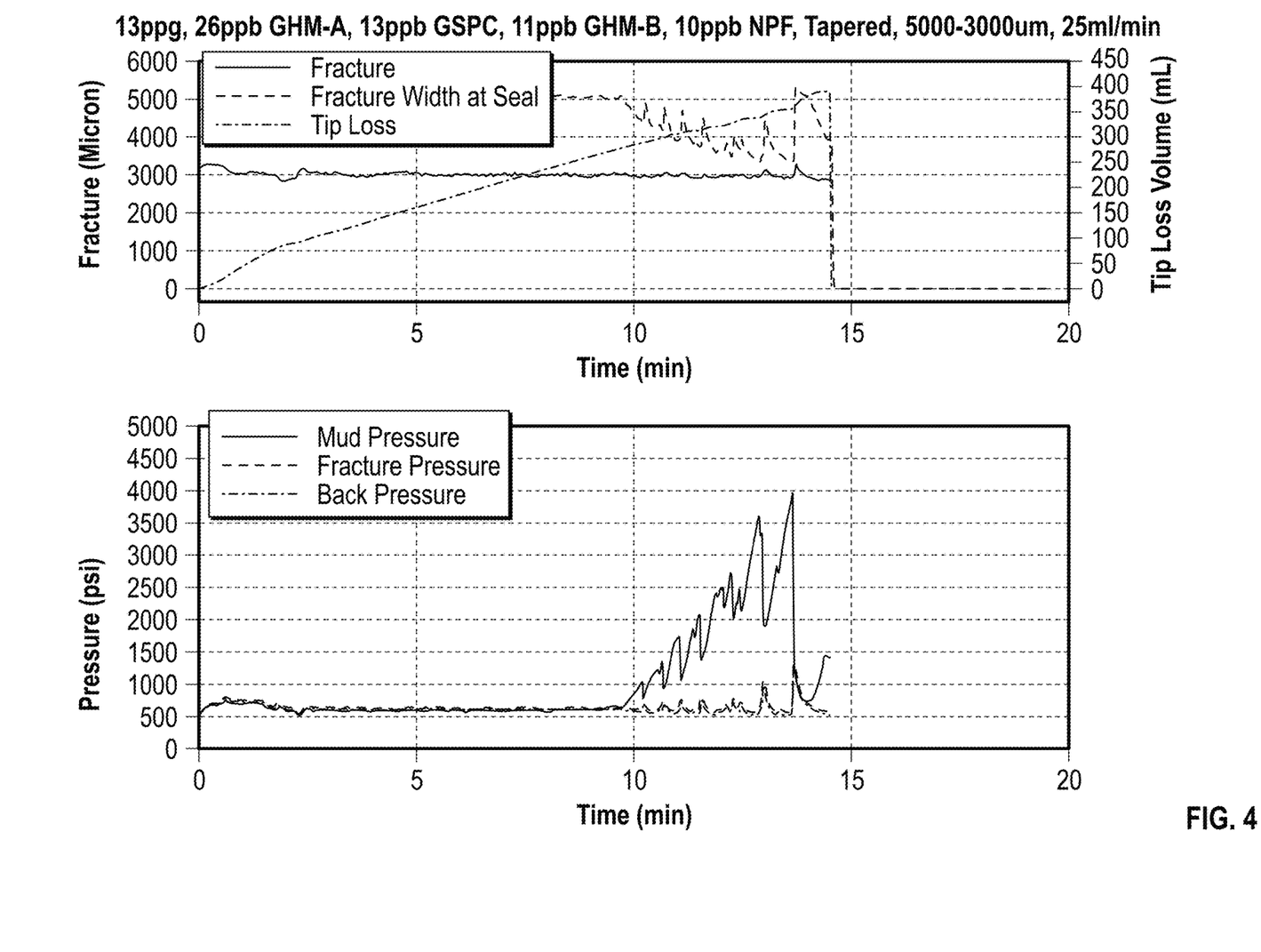

For the second example, the test was conducted with the formulation described in Table 2, and provided graphical results shown in FIG. 4. Test fluid was injected at a rate of 25 ml/min, and the fracture width was tapered from about 5 mm to about 3 mm. Both GHM-A and GHM-B were included in the test fluid, and GHM-A had an average particle size distribution $D_{90}$ of about 3.8 mm and $D_{10}$ of about 2.5 mm. Similar to the first example, and as shown by the tip loss rate and back pressure measurements shown in FIG. 4, the plug or seal formed was effective at elevated pressures, which in this test, were increased up to about 4000 psi. The plug or seal remained substantially undamaged, even as the mud pressure increased from about 500 psi to about 4000 psi, with intermittent pressure modulations induced during the overall pressure increase. This second example also illustrates depicts effectiveness of granular hemicellulose materials for contributing to the sealing or plugging fractures to avoid lost circulation of drilling fluid.

While embodiments have been illustrated and described in detail in the foregoing description, the same is to be considered as illustrative and not restrictive in character, it being understood that only some example embodiments have been shown and described and that all changes and modifications that come within the spirit of the inventions are desired to be protected. It should be understood that while the use of certain terms in the description above may indicate that the feature so described may be more desirable or characteristic, embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim.

We claim:

1. A method of reducing fluid loss in a subterranean formation, the method comprising:
    preparing a fluid loss composition, wherein the fluid loss composition comprises:
        a base fluid;
        a plurality of granular hemicellulose material; and
        a plurality of particulate solids dispersed in the fluid loss composition,
        wherein the plurality of granular hemicellulose material has a particle size distribution of $D_{90}$ of about 10 mm or less and $D_{10}$ of about 0.1 mm or greater, and an average aspect ratio equal to or less than about 5:1, the plurality of granular hemicellulose material content is from about 1 ppb to about 50 ppb; wherein the granular hemicellulose material comprises;
            hemicellulose in an amount from about 10% to about 50% by weight;
            cellulose in an amount from about 30% to about 50% by weight; and lignin in an amount from about 5% to about 35% by weight;
    emplacing the fluid loss composition in an interval of the subterranean formation;
    forming a three-dimensional network at the interval using the plurality of granular hemicellulose; and
    entrapping the plurality of particulate solids within the interval using the formed three-dimensional network to form a filtercake.

2. The method of claim 1, further comprising:
    applying pressure to the wellbore to drive the fluid loss composition into the formation.

3. The method of claim 2, further comprising:
    allowing the fluid loss composition to form a plug or seal in at least one interval of the subterranean formation.

4. The method of claim 1, wherein the plug or seal formed is sufficient to withstand applied pressures of up to about 4500 psi.

5. The method of claim 1, further comprising:
    introducing at least one spacer pill into the wellbore before introducing the fluid loss composition.

6. The method of claim 1, further comprising:
    introducing at least one spacer pill after the fluid loss composition is introduced into the wellbore.

7. The method of claim 1, further comprising: introducing a second fluid loss composition in a second interval of the wellbore.

8. The method of claim 1, wherein a ratio of the plurality of granular hemicellulose material to the plurality of particulate solids ranges from about 50:1 to about 1:50.

9. The method of claim 1, wherein the plurality of particulate solids has an average diameter ranging from about 7 microns to about 3000 microns.

10. A method of sealing a fracture in a subterranean formation, the method comprising:
    preparing a fluid loss composition, wherein the fluid loss composition comprises:
        a base fluid;
        a plurality of granular hemicellulose material; and
        a plurality of particulate solids dispersed in the fluid loss composition, wherein the plurality of granular hemicellulose material has a particle size distribution $D_{90}$ of about 4 mm or less and $D_{10}$ of about 1 mm or greater and an average aspect ratio equal to or less than about 5:1, the plurality of granular hemicellulose material content is from about 1 ppb to about 50 ppb, the granular hemicellulose material comprises hemicellulose, cellulose, and lignin, a concentration of the lignin is about 5% to about 35% by weight, and the particulate solids have a median particle size of no greater than 1500 microns;
    emplacing the fluid loss composition in the fracture in the subterranean formation;
    forming a three-dimensional network at the fracture using the plurality of granular hemicellulose; and
    entrapping the plurality of particulate solids within the fracture using the formed three-dimensional network to form a filtercake that seals the subterranean formation.

11. The method of claim 10, wherein a ratio of the plurality of granular hemicellulose material to the plurality of particulate solids ranges from about 5:1 to about 1:5.

* * * * *